United States Patent [19]

Fukushima

[11] Patent Number: 5,396,749
[45] Date of Patent: Mar. 14, 1995

[54] METHOD OF CUTTING OFF WATER FLOW BY GROUTING

[75] Inventor: Takuo Fukushima, Tokyo, Japan
[73] Assignee: Asahi Denki Kogyo K.K., Tokyo, Japan
[21] Appl. No.: 120,662
[22] Filed: Sep. 13, 1993

[30] Foreign Application Priority Data

Sep. 16, 1992 [JP] Japan ................ 4-246357

[51] Int. Cl.⁶ ............................ E04G 21/00
[52] U.S. Cl. ........................ 57/744; 405/264
[58] Field of Search ............ 52/744; 106/630, 623, 106/801, 812

[56] References Cited

U.S. PATENT DOCUMENTS

4,315,703 2/1982 Gasper ................ 405/264
4,904,304 2/1990 Watanabe et al. ............ 106/85

*Primary Examiner*—Carl D. Friedman
*Assistant Examiner*—Creighton Smith
*Attorney, Agent, or Firm*—Flynn, Thiel, Boutell & Tanis

[57] ABSTRACT

There is disclosed a method of cutting off water flow by grouting characterized by injecting a water flow cutoff agent (grout) comprising colloidal silica as the main component, a water flow cutoff agent comprising a water-soluble urethane diluted with water, or a water flow cutoff agent comprising a mixture of the above two kinds of water flow cutoff agents into a water-leaking part or a cavity. Also disclosed is a method of cutting off water flow by grouting characterized by injecting a water flow cutoff agent comprising colloidal silica as the main component into a water-leaking part or a cavity and then injecting thereinto a water flow cutoff agent comprising a water-soluble urethane diluted with water or a water flow cutoff agent comprising a mixture of a water flow cutoff agent comprising colloidal silica as the main component with a water flow cutoff agent comprising a water-soluble urethane diluted with water. The water flow cutoff agents according to the present invention are nonpolluting and provide hardened products having excellent water pressure resistance and durability.

11 Claims, No Drawings

METHOD OF CUTTING OFF WATER FLOW BY GROUTING

FIELD OF THE INVENTION

The present invention relates to a method of cutting off water flow by grouting, and more particularly to a method of cutting off water flow by grouting whereby water leaking from a concrete wall or segment joint of a general tunnel structure, or flowing in a cavity formed on the back side of a concrete wall, is cut off to prevent troubles due to water leakage and collapse of the ground.

PRIOR ART

Water-leaking parts and cavities have heretofore been filled with a water glass grout to cut off water flow. In the case of a water-leaking part, however, a grout of flash setting formulation is used in order to prevent it from being so diluted with water that it cannot be hardened. In this case, the amount of a hardening agent to be used is comparatively large, but still about one half of the amount thereof required to fully neutralize sodium in water glass, with the result that the hardened product is strongly alkaline, which raises the problem of soil and water pollution. Furthermore, the hardened product, even in the case of common grouting of the ground, lets silica gradually leach therefrom by the action of running water and, in some cases, substantially disappear after about half a year. It is thus apparent that the hardened product formed using the above-mentioned grout formulation as a water flow cutoff agent is poor in durability.

On the other hand, in order to fill a cavity, a grout formulation must have such a long hardening time that the cavity is perfectly filled up therewith. A hardened product formed using such a grout formulation contains such a large amount of alkali residues and is subject to silica leaching so easily, as compared with the above-mentioned grout formulation to be used in water-leaking parts, that it is extremely poor in durability, not to mention the problem of pollution.

When the water flow is cut off in a water-leaking part, in particular, when the leakage water pressure is high, a grout formulation, when injected into the water-leaking part, must be instantaneously hardened without substantial dilution thereof with water and provide a hardened product strong enough to resist the water pressure. When a cavity filled with water is filled with a grout, there is a fear of collapse of the ground due to any extra pressure applied to weak portions of the ground unless dilution of the grout with water is minimized and unless the grout is injected into the cavity simultaneously with the water drainage therefrom. A large cavity is comparatively difficult to perfectly fill with a grout, and lets the grout escape therefrom through water-leaking parts thereof, etc. In this case, therefore, the hardenability and fluidity of the grout must be adjusted.

DESCRIPTION OF THE INVENTION

As a result of intensive investigations, the inventors of the present invention have discovered nonpolluting water flow cutoff agents, or grouts, capable of providing hardened products having excellent water pressure resistance and durability, and have completed methods of cutting off water flow by grouting according to the present invention on the basis of such findings.

The invention provides a method for cutting off water flow, comprising the step of grouting or injecting a water flow curing-off agent into a water-leaking part or cavity, said agent comprising a member selected from the group consisting of (1) colloidal silica, (2) a water-soluble urethane polymer and water and (3) a mixture of colloidal silica and a water-soluble urethane polymer.

The cutting off agent preferably comprises a colloidal silica and an inorganic salt at a weight ratio of the inorganic salt to colloidal silica in the range between 0.05 and 0.4. A preferable species of the colloidal silica is a dispersion in which an average size of $SiO_2$ particles is 10 micrometers or ranges between 5 and 50 millimicrons($m\mu$), preferably 10 and 30 millimicrons($m\mu$), obtained by treating a neutral silica sol to remove alkalis out, then condensing and concentrating the resultant composition to have a $SiO_2$ content of 20 to 30 percent by weight.

Another preferable embodiment of the agent comprises an aqueous mixture containing 0.5 to 30 percent by weight per water of a water-soluble urethane polymer and the balance of water.

A third preferable embodiment of the agent comprises a mixture of colloidal silica and a water-soluble urethane polymer or a mixture of colloidal silica, a water-soluble urethane polymer and water.

The agent preferably comprises a mixture of colloidal silica and 13 to 50 percent by weight of a water-soluble urethane polymer and the water-soluble urethane polymer has 2 to 10 percent by weight of terminal NCO groups. It is noted that the colloidal silica and the water-soluble urethane polymer have reacted with each other to form a urethane linkage between a silanol group and an isocyanate group.

Another embodiment of the method of the invention, (1) the agent comprising colloidal silica is first injected and then the agent comprising (2) a water-soluble urethane polymer and water or (3) a mixture of colloidal silica and a water-soluble urethane polymer is injected.

The urethane polymer is preferably a urethane prepolymer.

Thus, the present invention provides a method of cutting off water flow by grouting, characterized by injecting into a water-leaking part or a cavity a water flow cutoff agent comprising colloidal silica as the main component, a water flow cutoff agent comprising a water-soluble urethane diluted with water, or a water flow cutoff agent comprising a mixture of the above two water flow cutoff agents. The present invention further provides a method of cutting off water flow by grouting characterized by injecting a water flow cutoff agent comprising colloidal silica as the main component into a water-leaking part or a cavity and then injecting thereinto a water flow cutoff agent comprising a water-soluble urethane diluted with water or a water flow cutoff agent comprising a mixture of a water flow cutoff agent comprising colloidal silica as the main component with a water flow cutoff agent comprising a water-soluble urethane diluted with water.

The first method of cutting off water flow by grouting is characterized in that a water flow cutoff agent comprising colloidal silica as the main component is injected into a water-leaking part or a cavity. In the present invention, the "water flow cutoff agent comprising colloidal silica as the main component" refers to a grout formulation comprising colloidal silica blended with an inorganic salt as the hardening agent and, optionally, further with a gel time regulator.

The amount of the hardening agent to be used is preferably such that the weight ratio of the inorganic salt to $SiO_2$ is in the range of 0.05 to 0.4. Where the inorganic salt is a neutral salt of an alkali metal, the weight ratio is preferably in the range of about 0.1 to about 0.4. Where the inorganic salt is a neutral salt of an alkaline earth metal, the weight ratio is preferably in the range of about 0.05 to about 0.2. The gel time regulator is preferably blended in such an amount that the hardening time of the formulation is at most 30 minutes.

The colloidal silica to be used in the present invention is a dispersion of silica particles of about 10 μm in diameter which is prepared by passing a commercially available neutral silica sol, or a dilution of water glass, through an ion exchange resin to effect dealkalization thereof, condensing the dealkalized sol by heating or the like to a molecular weight of tens of thousands or more to effect stabilization thereof, and then concentrating the stabilized sol to an $SiO_2$ content of 20 to 30%. The inorganic salt is preferably a neutral salt, examples of which include potassium chloride, sodium chloride, magnesium chloride, magnesium sulfate, and sodium silicate. Examples of the gel time regulator include acidic Glauber's salt, sulfuric acid, and phosphoric acid.

Where the hardening time is to be lengthened, a small amount of an acid such as sulfuric acid is added to either the side of the main component or the side of the hardening agent. When a large amount of the hardening agent is added to provide a grout of flash setting formulation, the colloidal silica turns into a precipitated gel because it has a large molecular weight as mentioned above. The hardened product is, however, very resistant to silica leaching and increased in strength as a whole, with the gradual progress of the reaction since the colloidal silica has already been deprived of sodium and polymerized. Such a formulation is generally favorable for a case where it is injected into a cavity, but unfavorable for a case where a cavity is filled with water or a case where water leaks.

Where water flow is cut off in a water-leaking part, the hardening time of the water flow cutoff agent can be arbitrarily chosen depending on the water pressure, but the gel time thereof is preferably short.

Where a huge cavity is filled with the water flow cutoff agent, the hardening time thereof may be long. Where a grouting pressure can be applied, a part further beyond a gel structure can be filled with the water flow cutoff agent by the so-called "fracture grouting". The colloidal silica system (hardened product on the alkaline side) is especially suitable for filling up a huge cavity therewith because it is low in gel strength immediately after the hardening thereof. In keeping with the conditions of a site of application, the water flow cutoff agent may be admixed with a filler, examples of which include river sand, bentonite, calcium carbonate, and slug. In the case of filling up a cavity, a hardened product strength even below 10 kgf/cm² will suffice.

Representative formulations of the water flow cutoff agent comprising colloidal silica as the main component according to the present invention are shown together with the hardenabilities thereof in Table 1, wherein the unit of amount is parts by weight. Permarock AT-30 has an average size of 10–20 mμ.

TABLE 1

| | Permarock AT-30 | KCl | Acidic Glauber's Salt | Water | Gel time |
|---|---|---|---|---|---|
| 1 | 100 | 10 | | 80 | 4 sec |
| 2 | 97 | 2.8 | 0.2 | 49 | 14 min |
| 3 | 96 | 2.5 | 0.5 | 19 | 3 min 30 sec |

| | Permarock AT-30 | KCl | Acidic Glauber's Salt | Sodium silicate No. 3 | Water | Gel time |
|---|---|---|---|---|---|---|
| 4 | 100 | 5.0 | 2.7 | 10 | 99 | 12 min |
| 5 | 100 | | 6.0 | 12.8 | 35 | 1 min |
| 6 | 100 | 1.0 | 6.0 | 12.8 | 35 | 20 sec |
| 7 | 100 | | 7.5 | 26.7 | 64 | 5 sec |

| | Permarock AT-30 | 72% sulfuric acid | KCl | Sodium silicate No. 4 | Water | Gel time |
|---|---|---|---|---|---|---|
| 8 | 200 | 8.8 | 1.5 | 57.0 | 46 | 9 min |
| 9 | 200 | 8.8 | 0.8 | 56.0 | 46 | 2 min |
| 10 | 200 | 9.0 | 1.5 | 51.0 | 42 | 15 min |

The second method of cutting off water flow by grouting is characterized in that a water flow cutoff agent comprising a water-soluble urethane diluted with water is injected into a water-leaking part or a cavity. The use of a water-soluble urethane as a water flow cutoff agent has already been known. However, such a water-soluble urethane has a high viscosity and hence a poor infiltration performance as compared with water, while it is so poorly miscible with water that the hardenability thereof is deteriorated. Accordingly, the water-soluble urethane is sometimes injected in excess of the necessary amount thereof. There is a method of diluting the water-soluble urethane with a solvent to lower the viscosity thereof. In this case, however, the water-soluble urethane diluted with the solvent is sometimes injected in excess of the necessary amount thereof as well when a sufficient amount of water is not available, while at the same time posing the problem of pollution. By contrast, the water-soluble urethane, which is diluted with water, has a low viscosity and hence a good infiltration performance and enables the gel time thereof to be arbitrarily regulated. Furthermore, it cures in a short time without fail, thus permitting limited grouting.

Examples of the water-soluble urethane to be used in the water flow cutoff agent comprising the water-soluble urethane diluted with water according to the present invention include the following water-swellable urethane prepolymers and non-water-swellable urethane prepolymers.

The water-swellable urethane prepolymers which have a terminal NCO group content of 1.5 to 10% are prepared by reacting a polyisocyanate with at least one polyether polyol represented by the general formula (I):

$$R[(OR_1)_nOH]_p$$

wherein R is a polyhydric alcohol residue; $(OR_1)_n$ is a polyoxyalkylene chain comprising a polyoxyalkylene group(s) having 3–4C alkylene groups and a polyoxyethylene group(s), provided that the proportion of oxyethylene groups accounts for 50 to 90% of the total molecular weight of the polyoxyalkylene chain; n stands for a number indicating the degree of polymerization of oxyalkylene groups and corresponding to a hydroxyl equivalent of 500 to 4,000; and p is a number of 2 to 8.

The nonwater-swellable urethane prepolymers which contain terminal NCO groups are prepared by reacting a polyisocyanate with at least one polyether polyol represented by the general formula (II):

$$R_2[(OR_3)_mOH]_q$$

wherein $R_2$ is a polyhydric alcohol residue; $(OR_3)_m$ is a polyoxyalkylene chain having 3–4C alkylene groups; m stands for a number indicating the degree of polymerization of oxyalkylene groups and corresponding to a hydroxyl equivalent of 500 to 4,000; and q is a number of 2 to 8.

The water-swellable urethane prepolymers and non-water-swellable urethane prepolymers may be used either alone or in combination. In the latter case, the water-swelling capacity of the water-soluble urethane can be adjusted to control the water pressure resistance of the hardening product.

The urethane prepolymers are preferably used after being diluted with water to a concentration of 0.5 to 30 wt. % based on water.

The third method of cutting off water flow by grouting is characterized in that a water flow cutoff agent comprising a mixture of a water flow cutoff agent comprising colloidal silica as the main component with a water flow cutoff agent comprising a water-soluble urethane (including one comprising a water-soluble urethane diluted with water) is injected into a water-leaking part or a cavity.

When colloidal silica is mixed with a water-soluble urethane, the silanol groups of the colloidal silica react with the isocyanate groups of the water-soluble urethane to form urethane bonds to thereby form an inorganic-organic composite (see, for example, GB 1504929). Colloidal silica alone, when hardened, turns into rigid brittle matter, whereas the water-soluble urethane alone, when hardened, turns only into elastic but soft matter with a low water pressure resistance. By contrast, the compound obtained according to the present invention is elastic, probably due to the high cross-linking density thereof, and nevertheless has a high tear resistance and a high water pressure resistance.

Particularly where the colloidal silica is used in admixture with the water-soluble urethane to form an inorganic-organic composite through the reaction of both, the terminal NCO group content of the water-soluble urethane is preferably at least 2.0%, and the amount of the water-soluble urethane is preferably at least 13 wt. % based on the total amount of the colloidal silica (the amount thereof being calculated from a concentration of 30%) and the water-soluble urethane.

Examples of the formulation of the mixture type water flow cutoff agent are shown together with the properties thereof in Table 2 (water-soluble urethanes 1 and C-50 will be detailed later).

TABLE 2

| | Permarock AT-30 | Water-soluble urethane 1 | C-50 | Hardenability and properties |
|---|---|---|---|---|
| 1 | 100 | 16 | | gels in 2 min, elastic, and high in tear resistance |
| 2 | 100 | 40 | | gels in 20 sec, elastic, and high in tear resistance |
| 3 | 100 | | 10 | high in viscosity, gels by contact with water, elastic but large in deformation |
| 4 | 100 | | 40 | high in viscosity, gels by contact with water, elastic but slightly large in deformation |

The fourth method of cutting off water flow by grouting according to the present invention is characterized in that first a water flow cutoff agent comprising colloidal silica as the main component is injected into a water-leaking part or a cavity and then a water flow cutoff agent comprising a water-soluble urethane diluted with water or a water flow cutoff agent comprising a mixture of a water flow cutoff agent comprising colloidal silica as the main component with a water flow cutoff agent comprising a water-soluble urethane (including one comprising a water-soluble urethane diluted with water) is injected into the water-leaking part or the cavity.

The injection of a water flow cutoff agent comprising a water-soluble urethane diluted with water or a water flow cutoff agent comprising a mixture of a water flow cutoff agent comprising colloidal silica as the main component with a water flow cutoff agent comprising a water-soluble urethane (including one comprising a water-soluble urethane diluted with water) into a water-leaking part or a cavity after the injection of a water flow cutoff agent comprising colloidal silica as the main component into the water-leaking part or the cavity may be conducted irrespective of whether or not the water flow cutoff agent comprising colloidal silica as the main component is in a hardened state. Where a water pressure resistance is particularly required of a hardened product, the water flow cutoff agent comprising a water-soluble urethane diluted with water must be used in a larger amount. In such a case, this water flow cutoff agent is preferably injected when the water flow cutoff agent comprising colloidal silica as the main component is still in a nonhardened state. Where a water pressure resistance is not so required of a hardened product, the water flow cutoff agent comprising the water-soluble urethane diluted with water may be used in a smaller amount. In such a case, it will suffice when this water flow cutoff agent is injected after the water flow cutoff agent comprising colloidal silica as the main component has been hardened.

The volume ratio of the water flow cutoff agent comprising colloidal silica as the main component to the water flow cutoff agent comprising a water-soluble urethane diluted with water or the water flow cutoff agent comprising a mixture of the water flow cutoff agents comprising colloidal silica as the main component with the water flow cutoff agent comprising a water-soluble urethane (including one comprising a water-soluble urethane diluted with water), which ratio can be arbitrarily set in keeping with the conditions of water leakage, may be in the range of 1:9 to 9:1. Where no substantial water pressure resistance is required of a hardened product, it will suffice when the water flow cutoff agent comprising a water-soluble urethane diluted with water or the water flow cutoff agent comprising a mixture of the water flow cutoff agents comprising colloidal silica as the main component with the water flow cutoff agent comprising a water-soluble urethane (including one comprising a water-soluble urethane diluted with water) is injected in a small amount into a part adjoining the outside and lying around an injection port for the purpose of preventing drying thereof or completely cutting off water flow (to such an extent that the surface of concrete dries).

The hardened product of the water-soluble urethane hardly dries and has a high water pressure resistance. On the other hand, the hardened product of colloidal silica constitutes a wholly inorganic system and is excellent in durability. When both are used in combination, perfect water flow cutoff can be maintained for a long period of time.

The amount of the water flow cutoff agent comprising colloidal silica as the main component and the water flow cutoff agent comprising a water-soluble urethane (including the water flow cutoff agent comprising a water-soluble urethane diluted with water), when used either alone or in combination, may be determined depending on the conditions of the ground, the amount of water leakage, the volume of a cavity, etc.

EXAMPLES

Example 1

The Formulation No. 7 of water flow cutoff agent (grout) listed in Table 1 was injected into the following acrylic water flow cutoff tester to examine the water flow cutoff conditions and the water pressure resistance of the hardened product.

Acrylic water flow cutoff tester

Two acrylic plates having a longitudinal length of 102 cm and a lateral length of 19.5 cm with a rubber packing sandwiched therebetween and located in the periphery thereof were so fastened with bolts that the space between the two plates was 1 mm. The front plate of such a mold was provided with a injection port and a few water drainage ports wherein cutoff cocks were set. Thus a tester, or mold, was formed.

The method and results of examination are as follows.

Pressured water under a pressure of 0.2 kgf/cm$^2$ was flowed into the mold through an upper cock while allowing the pressured water to flow out of the mold through the other upper cocks. The mold was filled with the pressured water. The grout was injected into the mold through a lower cock under an injection pressure of 0.8 kgf/cm$^2$ for 33 seconds. The mold was completely filled up with the hardened product of the grout while the pressured water ceased to flow out of the drainage ports. After one day, pressured water under a pressure of 0.7 kgf/cm$^2$ was applied into the mold through the injection port, but no water leakage occurred. After 4 days, pressured water under a pressure of 2 kgf/cm$^2$ was applied into the mold through the injection port, but no water leakage occurred (in this case, the water pressure resistance was estimated at 2 kgf/cm$^2$).

Example 2

A 5% dilution of C-50 (water-soluble urethane manufactured by Asahi Denka Kogyo K. K.) with water was injected into the same acrylic water flow cutoff tester as that used in Example 1 in substantially the same manner as that of Example 1. After hardening, pressured water under a pressure of 2 kgf/cm$^2$ was applied into the mold through the lower cock, but no water leakage occurred.

The above-mentioned C-50 was prepared according to the following procedure.

20 parts of a trifunctional polyether having a molecular weight of 7,000 and an oxyethylene group content of 80% and prepared by the random addition reaction of propylene oxide and ethylene oxide with glycerin was mixed with 80 parts of a bifunctional polyether having a molecular weight of 5,000 and an oxyethylene group content of 70% and prepared by the random addition reaction of propylene oxide and ethylene oxide with propylene glycol. Tolylene diisocyanate was added to the resulting mixture to effect a reaction therebetween at 90° C. for 3 hours to obtain a water-swellable urethane prepolymer having an NCO content of 2.0%.

Example 3

The Formulation No. 7 of colloidal silica water flow cutoff agent (grout) listed in Table 1 was injected into the same acrylic water flow cutoff tester as that used in Example 1 under an injection pressure of 0.5 kgf/cm$^2$. After the hardening of the grout, a 5% dilution of C-50 with water was injected into the mold under an injection pressure of 0.8 kgf/cm$^2$.

The hardened urethane product was formed near the injection port. The hardened urethane product accounted for about 1/10 of the whole hardened product including the hardened colloidal silica product. After one day, a water pressure resistance test was conducted by applying pressured water into the mold through the urethane injection port. No water leakage occurred even under a water pressure of 5 kgf/cm$^2$.

Example 4

10 parts of the following Water-soluble Urethane 1 was homogeneously mixed with 200 parts of Permarock AT-30. The resulting mixture was injected into the same acrylic water flow cutoff tester as that used in Example 1 under an injection pressure of 0.5 kgf/cm$^2$. After one day, a water pressure resistance test was conducted by applying pressured water into the mold through the injection port. No water leakage occurred even under a water pressure of 7 kgf/cm$^2$.

Water-soluble Urethane 1 (manufactured by Asahi Denka Kogyo K. K.)

This substance was prepared in substantially the same manner as that of the preparation of C-50 in Example 2. It had a molecular weight of 7,000, an ethylene oxide content of 80%, and an NCO content of 3.5%.

Example 5

The Formulation No. 7 of colloidal silica water flow cutoff agent (grout) listed in Table 1 was injected into the same acrylic water flow cutoff tester as that used in Example 1 under an injection pressure of 0.5 kgf/cm$^2$. After the hardening of the grout, a mixture of the same colloidal silica and the same Water-soluble Urethane 1 as those used in Example 4 was injected into the mold under an injection pressure of 1.0 kgf/cm$^2$.

The hardened colloidal silica-urethane product was formed near the injection port and accounted for about 4/10 of the whole hardened product including the hardened colloidal silica product. With respect to the water pressure resistance of the hardened product, no water leakage occurred even under a water pressure of 7 kgf/cm$^2$.

What we claim is:

1. A method for cutting off water flow, said method comprising a step of grouting or injecting a water flow cut-off agent into a water-leaking part or cavity, said agent comprising one or more members selected from the group consisting of (1) colloidal silica and a water-soluble urethane polymer, (2) colloidal silica and an inorganic salt, (3) a colloidal silica dispersion having an average SiO$_2$ particle size of between 5 and 50 μm and obtained by treating a neutral silica sol to remove alkalis and produce a resultant composition and condensing and concentrating the resultant composition to have a SiO$_2$ content of 20 to 30 percent by weight, and (4) an aqueous mixture containing 0.5 to 30 percent by weight of a water-soluble urethane polymer and the balance being water.

2. The method as claimed in claim 1, in which the agent comprises a colloidal silica and an inorganic salt at a weight ratio of the inorganic salt to colloidal silica in the range between 0.05 and 0.4.

3. The method as claimed in claim 1, in which the agent comprises a colloidal silica dispersion in which the average size of SiO$_2$ particles ranges between 5 and 50 μm and is obtained by treating a neutral silica sol to remove alkalis and produce a resultant composition, and condensing and concentrating the resultant composition to have a SiO$_2$ content of 20 to 30 percent by weight.

4. The method as claimed in claim 2, in which the inorganic salt is selected from the group consisting of potassium chloride, sodium chloride, magnesium chloride, magnesium sulfate and sodum silicate.

5. The method as claimed in claim 1, in which the agent comprises an aqueous mixture containing 0.5 to 30 percent by weight of a water-soluble urethane polymer and the balance being water.

6. The method as claimed in claim 1, in which the agent comprises a mixture of colloidal silica and a water-soluble urethane polymer.

7. The method as claimed in claim 1, in which the agent comprises a mixture of colloidal silica, a water-soluble urethane polymer and water.

8. The method as claimed in claim 1, in which the agent comprises a mixture of colloidal silica and a water-soluble urethane; the colloidal silica being a dispersion having an average size of SiO$_2$ particles ranges between 5 and 50 μm and obtained by treating a neutral silica sol to remove alkalis and produce a resultant composition, and condensing and concentrating the resultant composition to have a SiO$_2$ content of 20 to 30 percent by weight.

9. The method as claimed in claim 1, in which the agent comprises a mixture of colloidal silica and 13 to 50 percent by weight of a water-soluble urethane polymer and the water-soluble urethane polymer has 2 to 10 percent by weight of terminal NCO groups.

10. The method as claimed in claim 1, in which the agent comprises a mixture of colloidal silica and a water-soluble urethane polymer, the colloidal silica and the water-soluble urethane polymer having reacted with each other to form a urethane linkage between a silanol group and an isocyanate group.

11. The method as claimed in claim 1, in which (1) the agent comprising colloidal silica is first injected and then the agent comprising (2) a water-soluble urethane polymer and water or (3) a mixture of colloidal silica and a water-soluble urethane polymer is injected.

* * * * *